United States Patent [19]

Oishi et al.

[11] 4,092,283

[45] May 30, 1978

[54] GRAVURE INK BINDER FOR PAPER AND PROCESS FOR PREPARING THE SAME

[75] Inventors: Toshio Oishi, Nishinomiya; Takashi Kitano, Osaka; Hiroshi Sasaki, Nara; Tetuo Yamashita, Tondabayashi, all of Japan

[73] Assignee: Arakawa Rinsan Kagaku Kogyo Kabushiki Kaisha, Osaka, Japan

[21] Appl. No.: 589,087

[22] Filed: Jun. 23, 1975

[30] Foreign Application Priority Data

Jun. 25, 1974 Japan .................................. 49-73043

[51] Int. Cl.$^2$ ............................................. C08L 93/00
[52] U.S. Cl. .......................... 260/27 BB; 260/33.6 R
[58] Field of Search ..................... 260/27, 25, 27 BB

[56] References Cited

U.S. PATENT DOCUMENTS

| | | | |
|---|---|---|---|
| 3,468,829 | 9/1969 | Yoshioka | 260/27 R |
| 3,475,362 | 10/1969 | Romaniok | 260/25 |
| 3,880,788 | 4/1975 | Rudolphy | 260/27 BB |
| 3,935,145 | 1/1976 | Rudolphy | 260/27 BB |

*Primary Examiner*—Lewis T. Jacobs
*Attorney, Agent, or Firm*—Armstrong, Nikaido, Marmelstein & Kubovcik

[57] ABSTRACT

Gravure ink binder for paper comprising the reaction product of (a) cyclopentadiene, (b) $\alpha,\beta$-ethylenically unsaturated dicarboxylic acid or anhydride thereof, (c) resin acid and (d) metal compound, and having a softening point of 130° C. to 240° C. and acid value of not more than 100. The binder provides gravure inks for paper excellent in drying property and gloss.

19 Claims, No Drawings

GRAVURE INK BINDER FOR PAPER AND PROCESS FOR PREPARING THE SAME

BACKGROUND OF THE INVENTION

The present invention relates to a novel gravure ink binder for paper, and more particularly to the binder being capable of providing gravure inks excellent in drying property and gloss, and also to a process for preparing the same.

Gravure inks for paper are generally manufactured by blending pigments with a varnish prepared by dissolving rosin or a modified rosin as a binder in an organic solvent. In order to improve the drying property, gloss and other properties, it has been tried to modify the rosin, or to partially or completely replace the rosin binder with another binder such as a petroleum resin. For instance, it is proposed in U.S. Pat. No. 3,468,829 to use metal salts of petroleum resin modified with an α,β-dicarboxylic acid, esterification products thereof, or mixtures of the salt and rosin salt and/or modified rosin salt. However, inks empolying such binders are not necessarily satisfactory in drying property, gloss and odor. It is also proposed in Japanese Public Disclosure No. 42093/1973 to use a binder prepared by reacting a cyclopentadiene polymer with an unsaturated fatty acid, and if desired, further with an acrylic acid and/or acrylic ester monomer, in the presence of a metal compound. Such a binder is also unsatisfactory in the drying property and odor of inks and the gloss of printed face.

OBJECTS OF THE INVENTION

It is an object of the present invention to provide a novel gravure ink binder for paper.

A further object of the invention is to provide the binder useful for gravure inks for paper, which have excellent drying property and gloss, and are free from odor.

A still further objects of the invention is to provide a process for preparing the binder.

These and other objects of the invention will become apparent from the description hereinafter.

DETAILED DESCRIPTION

It has now been found that the above-mentioned objects can be accomplished by employing as a binder a reaction product of a cyclopentadiene, an α,β-ethylenically unsaturated dicarboxylic acid, a resin acid and a metal compound, which has a softening point of 130° to 240° C. and acid value of not more than 100.

The gravure inks incorporated with the binder of the present invention are excellent in drying property and gloss and also are free from odor, and are available for paper printing. The binders of the present invention are readily prepared by thermally reacting the above-mentioned ingredients.

Each ingredient employed as the starting material has the function mentioned below. The cyclopentadiene makes the binder bulky and also give the binder having a higher softening point than rosin. These characteristics have a good effect on the drying property of gravure inks. The dicarboxylic acid copolymerizes with the cyclopentadiene and the carboxylic groups react with the metal compound. The dicarboxylic acid makes the dispersibility of pigments improve. The resin acid forms the ester bonds at the positions of the double bond of the cyclopentadiene unit, by which the formation of the low molecular reaction product and the decomposition of the formed binder resin are inhibited. As a result, the drying property of the inks is improved and the odor is decreased. The formed ester group also makes the dispersibility of pigments raise, and the gloss of the printed face are improved. The metal compound reacts with the carboxylic group and forms the salt so as to raise the softening point of the binder and, therefore, the formation of the salt makes the drying property of the ink improve. Since the formation of the salt also has a good effect on the dispersion of pigments, the gloss is improved.

According to the present invention, it is also possible to readily control the acid value of the reaction product by further reacting the reaction product with the metal compound and/or an alcohol. The reaction product having an acid value of too high makes the ink unstable. When the acid value is decreased by reacting the reaction product with the alcohol, ester bonds are formed and the dispersibility of pigments is improved.

Examples of the cyclopentadiene employed in the present invention are cyclopentadiene, dicyclopentadiene and substitution products thereof where one or two hydrogens are replaced by methyl group. These cyclopentadienes are employed alone or in a form of mixture thereof. The cyclopentadienes are manufactured in large quantities in petrochemical industry, especially in the decomposition step of naphtha, and such cyclopentadienes usually contain about 5 to 10% by weight of other unsaturated hydrocarbons such as pentene, isoprene, piperylene and cyclopentadiene-isoprene adduct. In the present invention, the purified cyclopentadienes are, of course, preferably employed, but the impurities may be contained unless they impair the characteristics of the obtained binder resin.

In the present invention, a monocarboxylic acid such as acrylic acid, methacrylic acid or fatty acids does not give good results, and α,β-ethylenically unsaturated dicarboxylic acids are suitably employed. Examples of the α,β-ethylenically unsaturated dicarboxylic acid employed in the present invention are maleic acid, fumaric acid, itaconic acid, citraconic acid and anhydrides thereof. The dicarboxylic acid may be employed alone or in the form of a mixture thereof. In the present invention, maleic acid, maleic anhydride and fumaric acid are preferably employed. The dicarboxylic acid is employed in an amount of 1 to 30 parts by weight, preferably 3 to 28 parts by weight, per 100 parts by weight of the cyclopentadiene. When the amount of the dicarboxylic acid is less than 1 part by weight, the gloss of printed face becomes poor because the dispersibility of pigments in the ink lowers owing to scarcity of the polar group in the produced binder resin. When the amount of the dicarboxylic acid is more than 30 parts by weight, the acid value of the produced binder resin becomes too high and the stability of ink lowers.

Examples of the resin acid employed in the present invention are rosin, rosin modified with maleic acid, rosin modified with fumaric acid, partial esterification products of the above modified rosin such as the products of the above modified rosin and pentaerythritol, glycerin or diethylene glycol, polymerized rosin, disproportioned rosin, hydrogenated rosin and synthetic rosins. The resin acid may be employed alone or in a form of mixture thereof. In the present invention, rosin, rosin modified with maleic acid, rosin modified with fumaric acid, partial esterification products of the rosin modified with maleic acid and partial esterification products of the rosin modified with fumaric acid are preferably employed. As the synthetic rosin, there are preferably employed the synthetic rosin, which is reported in Japanese Patent Application No. 1704/1972, prepared by modifying the material of the formula

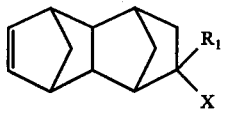

wherein $R_1$ is hydrogen or methyl group and X is nitrile group or an ester group, with an alkylbenzene and then hydrolyzing the product. The resin acid is employed in an amount of 5 to 100 parts by weight, preferably 10 to 85 parts by weight, per 100 parts by weight of the cyclopentadiene. When the amount of the resin acid is less than 5 parts by weight, the dispersibility of pigments in the ink lowers due to less formation of the ester bond in the produced binder resin, and moreover, the low molecular reaction product remains in the resulting reaction mixture. The low molecular reaction product makes the drying property of the ink lower and also emits a bad odor. When the amount of the resin acid is more than 100 parts by weight, the resin acid is in excess and is not economical. Such excess resin acid does not participate in the reaction in the present invention and merely exists in the obtained binder resin in a form of mixture therewith.

As the metal compound, bivalent metal oxides, bivalent metal hydroxides and bivalent metal acetates are employed. Examples of these metal compounds are calcium oxide, zinc oxide, magnesium oxide, barium oxide, calcium hydroxide, zinc hydroxide, magnesium hydroxide, barium hydroxide, calcium acetate, zinc acetate, magnesium acetate and barium acetate, and preferably calcium acetate, calcium hydroxide, zinc oxide and magnesium hydroxide are employed. The metal compound may be employed alone or in a form of mixture thereof. The amount of the metal compound is selected from the range of 0.05 to 11.0 parts by weight, preferably of 0.1 to 10.5 parts by weight, per 100 parts by weight of the cyclopentadiene. When the amount of the metal compound is less than 0.05 part by weight, the dispersibility of pigments becomes poor due to less formation of the metal salt of carboxylic acid, and moreover, the gloss of printed face becomes poor because the flow property of the ink lowers. When the amount of the metal compound is more than 11 parts by weight, the reaction product insoluble in a solvent may be produced, or the viscosity of the solution is apt to become too high when the reaction product is dissolved in a solvent in preparing the gravure ink.

The binder of the present invention is readily prepared by thermally reacting the above ingredients simultaneously or in consecutive stages at a temperature of 190° to 300° C. preferably 220° to 270° C. When the reaction is carried out at a temperature lower than 190° C., opaque, waxy, low molecular resin is produced and also the acyloxylation of the carboxylic group of resin acid takes place with difficulty. When the reaction temperature is higher than 300° C., control of the reaction rate is difficult and the resin insoluble in a solvent is apt to be produced. The reaction may be carried out in the presence of an organic solvent or in the absence of the solvent. When the solvent is employed in the preparation of the binder resin, the amount thereof is usually selected from 25 to 200 parts by weight per 100 parts by weight of the reactants. Examples of the organic solvent employed in the present invention are benzene, toluene, xylene and mineral spirit, and xylene is preferably employed in the invention.

In preparing the binder resin of the present invention, the ingredients are thermally reacted simultaneously or in stages. For instance, (a) The cyclopentadiene, $\alpha,\beta$-ethylenically unsaturated dicarboxylic acid, resin acid and metal compound are simultaneously reacted.

(b) The cyclopentadiene is first heat-polymerized, and then the resulting polymer is reacted with the $\alpha,\beta$-ethylenically unsaturated dicarboxylic acid, resin acid and metal compound at the same time or in order.

(c) The cyclopendadiene and $\alpha,\beta$-ethylenically unsaturated dicarboxylic acid are first heat-copolymerized, and then the resulting copolymer is reacted with the resin acid and metal compound at the same time or in order.

(d) The copolymer is first produced, and then reacted with the $\alpha,\beta$-ethylenically unsaturated dicarboxylic acid, resin acid and metal compound at the same time or in order. However, the way of reacting each ingredient is not limited to the above instances. In view of the easiness of controlling the reaction, the ways (b), (c) and (d) are suitably applied.

Generally, the reaction is carried out for 30 minutes to 20 hours, preferably 1 to 6 hours.

According to the present invention, the binder of the present invention may also be obtained by thermally reacting the cyclopentadiene, $\alpha,\beta$-ethylenically unsaturated dicarboxylic acid and resin acid at a temperature of 190° to 300° C., preferably 220° to 270° C. for 30 minutes to 20 hours, preferably 1 to 6 hours, and then reacting the resulting reaction product with the metal compound in the presence of an organic acid as a catalyst such as formic acid, acetic acid, lactic acid, tartaric acid or citric acid in a solvent such as benzene, toluene, xylene or mineral spirit at a temperature of 50° to 200° C. When the reaction of the first step is effected in the absence of the solvent, the second reaction between the reaction product and the metal compound is effected after dissolving the reaction product in the solvent. When toluene is employed as the solvent the obtained reaction mixture is usable as a varnish for the gravure ink as it is.

By selecting the kind and amount of each ingredient and the reaction conditions, the reaction products having a softening point of 130° to 240° C., preferably 150° to 220° C., and an acid value of not more than 100, preferably 75 are prepared. The reaction products so prepared are remarkably excellent as the binder for gravure inks. The binder having a softening point less than 130° C. is poor in drying property of the ink though it can provide the ink superior in the gloss of printed face. Also, the binder having a softening point more than 240° C. can provide the ink superior in the drying property, but the viscosity of its solution is too high. Therefore, when such a binder is employed and an ink having a viscosity suitable for printing is prepared, the binder content of the ink is low and the gloss of printed face lowers. Further, the binder having an acid value more than 100 makes the prepared ink unstable.

When the acid value of the reaction product is more than 100, or when it is desired to further decrease the acid value, or when it is desired to increase the ester bond in the reaction product in order to improve the dispersibility of pigments, the acid value of the reaction product is decreased by adding the alcohol to the reaction mixture and reacting the reaction product with the alcohol. Such an esterification reaction is usually carried out at a temperature of 180° to 270° C. Though the amount of the alcohol varies in accordance with the kind thereof, it is employed in an amount not causing the gelation of the reaction product, and usually employed in an amount of not more than 30 parts by weight, preferably 1 to 20 parts by weight, per 100 parts by weight of the cyclopentadiene employed. The alcohol may, of course, be added at the beginning of the preparation of binder or during the preparation of binder. As the alcohol, mono- and poly-hydric alcohols can be employed in the present invention. Examples of these alcohols are 2-ethylhexyl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, ethylene glycol, diethylene glycol, triethylene glycol, neopentyl alcohol, glycerin and pentaerythritol. Especially, diethylene glycol, diethylene glycol monoethyl ether and pentaerythritol are preferably employed.

When the prepared reaction product is desired to have higher softening point, the metal compound is further added to the resulting reaction mixture and reacted with the reaction product at a temperature of 180° to 270° C. Although the amount of the metal compound to be added varies in accordance with the acid value of the reaction product and the desired acid value, it is usually selected from 0.05 to 11 parts by weight per 100 parts by weight of the cyclopentadiene. The reaction between the reaction product and metal compound may also be carried out in a solvent such as benzene, toluene, xylene or mineral spirit in the presence of an organic acid as a catalyst such as formic acid, acetic acid, lactic acid, tartaric acid or citric acid, preferably acetic acid, at a temperature of 50° to 200° C. according to a known process. Toluene is suitably employed since the obtained reaction mixture is usable as the varnish for the gravure ink as it is.

After the completion of the reaction, the obtained reaction product can be utilized as the binder for the gravure ink as it is, or the reaction product is recovered by removing volatile materials such as the unreacted materials and low boiling substances, and also the solvent when it is employed. The solid reaction products so obtained are applied as the binder for gravure inks. A varnish for gravure ink is prepared by dissolving the binder in a solvent suitable for ink such as benzene and toluene. The obtained reaction mixture containing the solvent are also applicable as the varnish for gravure ink. Usually, such a reaction mixture is diluted by the solvent, and the viscosity and the concentration of binder are controlled to provide the varnish suitable for ink. In general, the varnish having a viscosity of 20 to 300 cP is suitable for the preparation of gravure inks, and the viscosity is freely selected from the above range depending on the kind of pigment to be blended. Also, the concentration of the binder desirable for the gravure ink is from 20 to 60% by weight and, therefore, the varnishes having the viscosity and concentration within the above ranges are availably employed in the preparation of the gravure inks.

The gravure inks for paper are prepared by blending the varnish so obtained with pigments in a usual way. Usually, the pigment is blended with the varnish in an amount of 1 to 30 parts by weight per 100 parts by weight of the varnish.

In the preparation of the gravure inks, the binder of the present invention may also be employed in combination with other resins, for instance, petroleum resin, petroleum resin modified with maleic acid, reaction products of the maleic acid modified petroleum resin with an alcohol and/or metal compound, cumaroneindene resin, rosin and their derivatives such as rosin, hydrogenated rosin, disporportioned rosin, polymerized rosin, rosin modified phenol resin or rosin modified maleic resin, esters and metal salts of the rosin and their derivatives, synthetic rosins and their esters and metal salts. In order to improve the abrasion resistance and flexibility, chlorinated rubber, chlorinated polypropylene or low molecular polyethylene may be added.

The present invention is more specifically described and explained by means of the following Examples, in which all parts and percentages are by weight except as noted.

EXAMPLE 1

A 3 liter autoclave was charged with 915 g. of dicyclopentadiene of 90% purity, 85 g. of maleic anhydride, 200 g. of rosin, 1.5 g. of calcium hydroxide and 866 g. of xylene. Air within the autoclave was thoroughly replaced with nitrogen gas and the temperature was elevated to 265° C. over about 2 hours. At this temperature, the reactants were heat-reacted for 4 hours and then the resulting reaction mixture was cooled.

A one liter round bottom flask equipped with a thermometer, stirrer, reflux condenser and water separator was charged with 600 g. of the reaction mixture. In an atmosphere of nitrogen, the reaction mixture was heated to remove xylene through the water separator. At 230° C., xylene and low boiling substances were removed and the reaction product was obtained. Further, the temperature was elevated to 250° C., and the reaction product was held at the temperature for 3 hours to give 325 g. of the binder resin.

The softening point and acid value of the resin were 165° C. and 50, respectively. The 52.5% toluene solution of the resin showed a viscosity of 40 cP at 25° C.

EXAMPLE 2

A 2 liter autoclave was charged with 915 g. of purified dicyclopentadiene, 85 g. of maleic anhydride and 666 g. of xylene. After replacing air within the autoclave with nitrogen gas, the temperature was elevated to 265° C. over about 2 hours, and at the temperature, the reactants were heat-reacted for 2 hours. The resulting reaction mixture was cooled and then subjected to distillation under reduced pressure. Distillates at a temperature of 190° C. under an absolute pressure of 10 mmHg were removed and 960 g. of cyclopentadiene-maleic anhydride copolymer having a softening point of 83° C. and saponification value of 99 was obtained.

A one liter round bottom flask equipped with a thermometer, stirrer, reflux condenser and water separator was charged with 240 g. of the obtained copolymer, 60 g. of rosin, 15 g. of maleic anydride and 1.5 g. of calcium acetate. The reactants were molten by heating in an atmosphere of nitrogen and the temperature was elevated to 250° C. At the temperature, the reaction was carried out for 6 hours, and 305 g. of the reaction product having a softening point of 170° C. and an acid value of 63 was obtained. The viscosity of a 53.5% toluene solution of binder resin so obtained was 40 cP at 25° C.

EXAMPLE 3

A 2 liter autoclave was charged with 1,000 g. of purified dicyclopentadiene and 660 g. of xylene. After replacing air within the autoclave with nitrogen gas, the temperature was elevated to 260° C. over about 2 hours. At the temperature, dicyclopentadiene was heat-polymerized for 2 hours and the resulting reaction mixture was cooled. Then the reaction mixture was subjected to reduced pressure distillation at a temperature of 190° C. and an absolute pressure of 10 mmHg, and distillates were removed. The obtained transparent cyclopentadiene polymer had a softening point of 75° C. and a saponification value of 0.

A one liter round bottom flask equipped with a thermometer, stirrer, reflux condenser and water separator was charged with 270 g. of the obtained polymer, 30 g. of rosin and 15 g. of maleic anhydride. The reactants were molten by elevating the temperature in an atmosphere of nitrogen. When the temperature reached 240° C., 3 g. of magnesium hydroxide was gradually added to the flask, and after the completion of the addition, the temperature was further elevated to 250° C. At the same temperature, the reaction was carried out in molten state for 5 hours to give 310 g. of the binder resin.

The resin had a softening point of 185° C. and an acid value of 22, and the viscosity of a 51.0% toluene solution of resin was 40 cP at 25° C.

EXAMPLE 4

A one liter round bottom flask equipped with a thermometer, stirrer, reflux condenser and water separator was charged with 240 g. of the cyclopentadiene polymer obtained in Example 3, 60 g. of rosin and 15 g. of maleic acid. In an atmosphere of nitrogen, the reactants were molten by elevating the temperature, and when the temperature reached 200° C., 9 g, of diethylene glycol and 0.9 g. of calcium acetate were added to the flask. Then the temperature was elevated to 260° C., and at the same temperature the reaction was carried out in molten state for 3 hours to give 305 g. of the binder resin.

The softening point and acid value of the resin so obtained were 180° C. and 20, respectively, and the viscosity of a 54% toluene solution of resin was 40 cP at 25° C.

EXAMPLE 5

A one liter round botton flask equipped with a thermometer, stirrer, reflux condenser and water separator was charged with 180 g. of the cyclopentadiene-maleic anhydride copolymer obtained in Example 2, 120 g. of rosin, 30 g. of maleic anhydride and 30 g. of ethylene glycol monobutyl ether. After melting the reactants by elevating the temperature in an atmosphere of nitrogen, the reaction was carried out at a temperature of 240° C. for 1 hour. (The obtained resin had a softening point of 115° C. and an acid value of 135.). Then, 15 g. of calcium hydroxide and 1.5 g. of calcium acetate were gradually added to the flask. After the completion of the addition, the temperature was elevated to 260° C. over one hour, and then 335 g. of the resulting reaction product was immediately taken out.

The softening point and acid value of the product so obtained were 161° C. and 50, respectively, and the viscosity of a 55% toluene solution of product was 40 cP at 25° C.

EXAMPLE 6

A 3 liter autoclave was charged with 990 g. of dicyclopentadiene, 30 g. of maleic anhydride and 680 g. of xylene. After replacing air within the autoclave with nitrogen gas, the temperature was elevated to 265° C. over about 2 hours, and at the same temperature dicyclopentadiene and maleic anhydride were heat-polymerized for 2 hours to give the copolymer. The resulting mixture was then cooled and subjected to distillation at a temperature of 190° C. and an absolute pressure of 10 mmHg to remove volatile materials and to give 985 g. of cyclopentadiene-maleic anhydride copolymer having a softening point of 90° C. and a saponification value of 33.

A one liter round bottom flask equipped with a thermometer, stirrer, reflux condenser and water separator was charged with 240 g. of the copolymer, 160 g. of rosin. In an atmosphere of nitrogen, the reactants were molten by elevating the temperature to 235° C., and at the same temperature the reaction was carried out in molten state for 3 hours to give 270 g. of a resin having a softening point of 140° C. and an acid value of 90.

Then, 200 g. of the resin so obtained was dissolved in 200 g. of toluene in the round bottom flask, and 1 g. of glacial acetic acid and 2 g. of zinc oxide were added to the flask at a temperature of 60° C. The reaction was carried out for one hour at the same temperature, and after the solution became transparent, 10 g. of calcium hydroxide was added to the flask and the reaction was further continued for 1 hour at a temperature of 70° C. Then the resulting reaction mixture was subjected to azeotropic distillation of toluene-water to remove water, and further distillation was carried out at a temperature of 110° to 115° C. for 1 hour to remove water and to give 385 g. of varnish containing the binder resin.

The viscosity of the so obtained varnish containing 52% of the resin was 40 cP at 25° C. Also, the softening point and acid value of the resin were 220° C. and 5, respectively.

EXAMPLE 7

A 3 liter autoclave was charged with 900 g. of purified dicyclopentadiene, 100 g. of fumaric acid and 670 g. of mineral spirit. Air within the autoclave was thoroughly replaced with nitrogen gas, and then the temperature was elevated to 270° C. over about 2 hours. At the same temperature, the reaction was carried out for 2 hours, and the resulting reaction mixture was cooled. Then the mixture was subjected to distillation at a temperature of 190° C. and an absolute pressure of 10 mmHg to remove volatile materials and 945 g. of transparent resin having a softening point of 98° C. and a saponification value of 60 was obtained.

A one liter round bottom flask equipped with a thermometer, stirrer, reflux condenser and water separator was charged with 240 g. of the resin so obtained and 69 g. of partial esterfication product of glycerin and rosin modified with fumaric acid (softening point: 120° C., acid value: 220). In an atmosphere of nitrogen, the reactants were molten by elevating the temperature to 240° C., and at the same temperature the reaction was carried out for one hour in molten state. The resulting resin had a softening point of 120° C. and an acid value of 100. After gradually adding 15 g. of calcium hydroxide and 1.5 g. of calcium acetate to the flask, the temperature was further elevated to 275° C. over 2 hours from the completion of the addition to give 305 g. of the binder resin.

The softening point and acid value of the resin so obtained were 170° C. and 30, respectively, and also the viscosity of a 52.3% toluene solution of resin was 40 cP at 25° C.

EXAMPLE 8

A one liter round bottom flask equipped with a thermometer, stirrer, reflux condenser and water separator was charged with 240 g. of the cyclopentadiene polymer obtained in Example 3, 60 g. of rosin modified with maleic acid having a softening point of 120° C. and an acid value of 225 and 9 g. of maleic anhydride. In an atmosphere of nitrogen, the reactants were molten by elevating the temperature to 200° C. When the temperature reached 200° C., 6 g. of pentaerythritol and 0.9 g. of calcium acetate were gradually added to the flask. After the completion of the addition, the temperature was elevated to 260° C., and at the same temperature the reaction was carried out for 3 hours to give 290 g. of the binder resin.

The softening point and acid value of the resin so obtained were 175° C. and 25, respectively, and the viscosity of a 52% toluene solution of resin was 40 cP at 25° C.

EXAMPLE 9

A 3 liter autoclave was charged with 800 g. of purified dicyclopentadiene, 200 g. of maleic anhydride and 670 g. of xylene. In an atmosphere of nitrogen, the temperature was elevated to 265° C. over about 2 hours, and at the same temperature, the reaction was carried out for 2 hours. After cooling the resulting reaction mixture, volatile materials were distilled at a temperature of 190° C. and an absolute pressure of 10 mmHg and 928 g. of a resin having a softening point of 88° C. and a saponification value of 225 was obtained.

A one liter round bottom flask equipped with a thermometer, stirrer, reflux condenser and water separator was charged with 240 g. of the obtained resin, 160 g. of rosin, 28 g. of diethylene glycol monobutyl ether and 12 g. of diethylene glycol. In an atmosphere of nitrogen, the temperature was elevated to 240° C., and at the same temperature the reaction was carried out in molten state for 2 hours. The obtained resin had a softening point of 82° C. and an acid value of 180. Further at the same temperature, 20 g. of calcium hydroxide was gradually added to the flask, and after the completion of the addition, the temperature was elevated to 270° C. over 1.5 hours. When the temperature reached 270° C., the resulting reaction product was immediately taken out to give 312 g. of the binder resin.

The softening point and acid value of the resin so obtained were 165° C. and 95, respectively, and the viscosity of a 52.1% toluene solution of resin was 40 cP at 25° C.

EXAMPLE 10

A one liter round bottom flask equipped with a thermometer, stirrer, reflux condenser and water separator was charged with 240 g. of the cyclopentadiene polymer obtained in Example 3, 60 g. of partial esterification product of pentaerythritol and rosin modified with maleic acid (softening point: 140° C., acid value: 140) and 9 g. of maleic anhydride. In an atmosphere of nitrogen, the reactants were molten by elevating the temperature to 200° C., and at the same temperature 3 g. of calcium acetate was added. After the completion of the addition, the temperature was elevated to 240° C. and the reaction was carried out in molten state for 2 hours to give 290 g. of the binder resin.

The softening point and acid value of the resin so obtained were 185° C. and 30, respectively, and also the viscosity of a 51.5% toluene solution of resin was 40 cP at 25° C.

EXAMPLE 11

A synthetic rosin was prepared as follows:

A 3 liter three neck flask equipped with a stirrer, dropping funnel and thermometer was charged with 250 g. of the material having the following formula:

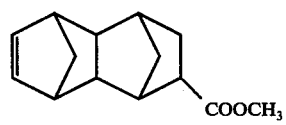

which was obtained by reacting cyclopentadiene with methyl acrylate. After dissolving the material in xylene by adding 1,000 g. of xylene to the flask, 12.5 g. of phenol-boron trifluoride complex was added as a catalyst to the flask, and then the reaction was carried out at a temperature of 80° C. for 3 hours. After the completion of the reaction, the catalyst was inactivated by 5% aqueous solution of sodium hydroxide and washing was made by adding water to the flask and shaking. After allowing to stand to separate into two layers, the resulting xylene layer was taken out. Then, xylene, the unreacted material and the produced low boiling substance were removed by distillation under reduced pressure, and thereafter, the distillation was further continued at a temperature of 210° to 225° C. and an absolute pressure of 3 mmHg to recover 262 g. of a resin. Further, 100 g. of the obtained resin was supplied into a one liter autoclave and then equimolecular amount of sodium hydroxide was added in a form of aqueous solution. The hydrolysis was carried out at a temperature of 180° C. for 2 hours. After the completion of the hydrolysis, the neutralization was made to precipitate the hydrolyzed resin. The resin so prepared was dissolved in xylene once, and after removing xylene, the resin was dried to give 95 g. of the synthetic rosin. The softening point and acid value of the synthetic rosin so prepared were 85° C. and 180.6, respectively.

A one liter round bottom flask equipped with a thermometer, stirrer, reflux condenser and water separator was charged with 240 g. of the cyclopentadiene-maleic anhydride copolymer obtained in Example 2, 66 g. of the synthetic rosin and 9 g. of maleic anhydride. In an atmosphere of nitrogen, the reactants were molten by elevating the temperature. When the temperature reached 220° C., 1.5 g. of calcium acetate and 9 g. of diethylene glycol were added to the flask. The temperature was further elevated to 250° C., and the reaction was carried out in molten state for 6 hours with maintaining the temperature to give the binder resin.

The resin so obtained had a softening point of 176° C. and an acid value of 50.5, and the viscosity of a 49.5% toluene solution of resin was 40 cP at 25° C.

EXAMPLE 12

A one liter round bottom flask equipped with a thermometer, stirrer, reflux condenser and water separator was charged with 240 g. of the cyclopentadiene-maleic anhydride copolymer obtained in Example 2, 60 g. of rosin modified with fumaric acid having a softening point of 135° C. and an acid value of 290 and 15 g. of maleic anhydride. In an atmosphere of nitrogen, the reactants were molten by elevating the temperature, and when the temperature reached 200° C., 4.5 g. of pentaerythritol, 15 g. of diethylene glycol monobutyl ether and 2.4 g. of calcium acetate were added to the flask. The temperature was further elevated and the reaction was carried out at a temperature of 240° C. for 3 hours to give 305 g. of the binder resin.

The resin so obtained had a softening point of 160° C. and an acid value of 45, and also the viscosity of a 53% toluene solution of resin was 40 cP at 25° C.

EXAMPLE 13

A liter round bottom flask equipped with a thermometer, stirrer, reflux condenser and water separator was charged with 180 g. of the cyclopentadiene-maleic anhydride copolymer obtained in Example 6 and 120 g. of partial esterification product of ethylene glycol and rosin modified with fumaric acid (softening point: 143° C., acid value: 275). In an atmosphere of nitrogen, the reactants were molten by elevating the temperature to 250° C., and at the same temperature 3 g. of calcium acetate and 6 g. of zinc oxide were added to the flask. Then, the reaction was carried out for 3 hours to give 295 g. of the binder resin.

The resin so obtained had a softening point of 180° C. and an acid value of 20, and also the viscosity of a 54.5% toluene solution of resin was 40 cP at 25° C.

EXAMPLE 14

The same procedure as in Example 3 was repeated except that cyclopentadiene was employed instead of dicyclopentadiene. The obtained binder resin had a softening point of 175° C. and an acid value of 20, and also the viscosity of a 55% toluene solution of resin was 40 cP at 25° C.

COMPARATIVE EXAMPLE 1

The same procedure as in Example 2 was repeated except that the cyclopentadiene-maleic anhydride copolymer was reacted with rosin and maleic anhydride without employing the metal compound to give 300 g. of a resin.

The resin so obtained had a softening point of 172° C. and an acid value of 67, and also the viscosity of a 53.9% toluene solution of resin was 40 cP at 25° C.

COMPARATIVE EXAMPLE 2

A one liter round bottom flask was charged with 300 g. of the cyclopentadiene-maleic anhydride copolymer obtained in Example 2. In an atmosphere of nitrogen, the copolymer was molten by elevating the temperature to 240° C., and at the same temperature 1.5 g. of zinc oxide and 1.5 g. of zinc acetate were added to the flask. After carrying out the reaction in the absence of the resin acid at 240° C. for 1 hour, 6 g. of calcium hydroxide was further added to the flask and the reaction was further continued at the same temperature for 3 hours. After elevating the temperature to 270° C. over one hour, 290 g. of the reaction product so prepared in the absence of the resin acid was taken out.

The softening point and acid value of the reaction product were 170° C. and 40, respectively, and also the viscosity of a 53.4% toluene solution of product was 40 cP at 25° C.

COMPARATIVE EXAMPLE 3

A one liter round bottom flask equipped with a thermometer, stirrer and reflux condenser was charged with 300 g. of the cyclopentadiene polymer obtained in Example 3. In an atmosphere of nitrogen, the polymer was molten by elevating the temperature to 240° C. After further elevating the temperature to 260° C., 30 g. of tall oil fatty acid and 0.9 g. of magnesium oxide were carefully added to the flask, and at the same temperature the reaction was carried out for 3 hours to give 310 g. of the reaction product.

The softening point and acid value of the reaction product were 150° C. and 12, respectively, and also the viscosity of a 47% toluene solution of the product was 40 cP at 25° C.

COMPARATIVE EXAMPLE 4

A one liter round bottom flask equipped with a thermometer, stirrer, reflux condenser and water separator was charged with 240 g. of the cyclopentadiene polymer obtained in Example 3 and 60 g. of rosin. In an atmosphere of nitrogen, the reactants were molten by elevating the temperature to 135° C., and at the same temperature 24 g. of acrylic was added to the flask. Then the reaction was carried out at the same temperature for two hours. The formation of large quantities of precipitate was observed. Further, after elevating the temperature to 230° C. and adding 6 g. of calcium hydroxide to the flask, the reaction was continued for 3 hours. The reaction mixture was filtered and 305 g. of the reaction product was obtained.

The reaction product so obtained had a softening point of 163° C. and an acid value of 16, and also the viscosity of a 47% toluene solution of the product was 40 cP at 25° C.

COMPARATIVE EXAMPLE 5

A one liter round bottom flask equipped with a thermometer, stirrer, reflux condenser and water separator was charged with 150 g. of petroleum resin having a softening point of 65° C., a bromine value of 43.9 and a molecular weight of 600, 30 g. of maleic anhydride and 1.5 g. of di-t-butyl peroxide. In an atmosphere of nitrogen, the reactants were molten by elevating the temperature to 145° C., and at the same temperature the reaction was made for 1 hour. Then, after elevating the temperature to 200° C. over 30 minutes and maintaining the temperature for 30 minutes, 150 g. of rosin was added and the reaction was made at the same temperature for 1 hour. Further, the temperature was elevated to 260° C. and 3 g. of zinc oxide, 1.5 g. of calcium acetate and 24 g. of calcium hydroxide were carefully added. After continuing the reaction at 260° C. for 3 hours, 335 g. of the reaction product was taken out.

The softening point and acid value of the reaction product so obtained were 190° C. and 45.1, respectively, and the viscosity of a 50% toluene solution of product was 40 cP at 25° C.

COMPARATIVE EXAMPLE 6

As the standard binder, calcium salt of partial esterification product of diethylene glycol and rosin modified with maleic acid having a softening point of 174° C. and an acid value of 50.2 was selected. The binder was dissolved in toluene to give a varnish. The viscosity of a 54% toluene solution of binder was 40 cP at 25° C.

Employing the varnish having a viscosity of 40 cP at 25° C. obtained in each Example and Comparative Example, red and blue gravure inks were prepared.

To 78 parts of the varnish were added 4 parts of Carmine 6B and 18 parts of calcium carbonate, and they were blended in a sand mill to prepare a red gravure ink.

To 80 parts of the varnish were added 5 parts of Phthalocyanine blue and 15 parts of calcium carbonate, and they were blended in a sand mill to prepare a blue ink.

The drying property, gloss, odor stability of the inks so prepared were tested and the results thereof are shown in the appended Table.

Each property was evaluated as follows:

(a) Drying property

The viscosity of the ink was adjusted by adding toluene to 16 sec. (20° C.) of Zahn cup No. 3. The ink so adjusted was collected by a glass syringe and 0.5 ml. of the ink was dropped at a dash on one end portion of a glass plate (12 × 16 cm.), and immediately the ink was quickly spread by a doctor blade of 4/1,000 mil. Time till the tackiness of the spread ink disappeared was measured by finger touching at a temperature of 20° C. and a relative humidity of 65%.

Comparing with the result of the standard ink prepared from the varnish of Comparative Example 6 containing calcium salt of partial esterification product of diethylene glycol and rosin modified with maleic acid, which is widely employed as a gravure ink for paper, the drying property of the ink was evaluated according to the following classification.

A: Drying rate is very fast.
B: Drying rate is faster than that of the standard ink.
C: Drying rate is approximately the same as that of the standard ink.
Drying rate is later than that of the standard ink.

(b) Gloss

The ink was coated to a gravure paper with a barcoater, and the gloss on the coated face was measured at the angles of 60°—60° of regular reflectivity.

(c) Odor

The ink was coated to a gravure paper with a barcoater of No. 8, and after lapse of 3 minutes, the coated paper was cut to pieces (1 × 1 cm.). Then, about 100 sheets of the cut paper were placed in a bottle, and held at a temperature of 50° C. for 4 hours. The odor was smelt, and evaluated according to the following classification. ◯: Odorless ◡: Week smell ×: Powerful smell

(d) Stability of ink

The prepared ink was kept at a temperature of 50° C. for 1 month, and the viscosity was measured by Zahn cup No. 3. The stability of ink was evaluated by the viscosity change according to the following classification. ◯ : The increase of viscosity is not more than 50% ◡: The increase of viscosity is 50 to 100% Δ: The increase of viscosity is 100 to 200% ×: The increase of viscosity is not less than 200%.

| Binder | Drying property | Gloss | Odor | Stability of ink |
|---|---|---|---|---|
| Ex. 1 | B | 49 | ◯ | ◯ |
| Ex. 2 | B | 48 | ◯ | ◯ |
| Ex. 3 | B | 46 | ◯ | ◯ |
| Ex. 4 | B | 49 | ◯ | ◯ |
| Ex. 5 | B | 48 | ◯ | ◯ |
| Ex. 6 | A | 42 | ◯ | ◯ |
| Ex. 7 | A | 41 | ◯ | ◯ |
| Ex. 8 | B | 43 | ◯ | ◯ |
| Ex. 9 | A | 41 | ◯ | ◯ |
| Ex. 10 | B | 45 | ◯ | ◯ |
| Ex. 11 | A | 50 | ◯ | ◯ |
| Ex. 12 | B | 44 | ◯ | ◯ |
| Ex. 13 | A | 43 | ◯ | ◯ |
| Ex. 14 | B | 44 | ◯ | ◯ |
| Com. Ex. 1 | C | less than 10 | ◯ | ◯ |
| Com. Ex. 2 | C | 40 | × | ◯ |
| Com. Ex. 3 | D | 13 |  | ◯ |
| Com. Ex. 4 | D | 16 | × | ◯ |
| Com. Ex. 5 | C | 20 |  | ◯ |
| Com. Ex. 6 (standard) | C | 38 | ◯ | ◯ |

What we claim is:

1. A gravure ink binder for paper comprising the reaction product of (a) at least one member selected from the group consisting of cyclopentadiene, dicyclopentadiene and substitution products thereof where one or two hydrogens are replaced by methyl group, (b) 1 to 30 parts of at least one member selected from the group consisting of $\alpha,\beta$-ethylenically unsaturated dicarboxylic acids and $\alpha,\beta$-ethylenically unsaturated dicarboxylic acid anhydrides, (c) 5 to 100 parts of a resin acid, and (d) 0.05 to 11 parts of at least one metal compound selected from the group consisting of bivalent metal oxides, bivalent metal hydroxides and bivalent metal acetates, said reaction product having a softening point of 150° to 220° C. and an acid value of not more than 100, and said parts of (b), (c) and (d) being parts by weight per 100 parts of (a).

2. The binder of claim 1, wherein said reaction product has an acid value of not more than 75.

3. The binder of claim 1, wherein said (a) is cyclopentadiene and/or dicyclopentadiene.

4. The binder of claim 1, wherein said (b) is at least one member selected from the group consisting of maleic acid, fumaric acid and maleic anhydride.

5. The binder of claim 1, wherein said resin acid is at least one member selected from the group consisting of rosin, rosin modified with maleic acid, rosin modified with fumaric acid, partial esterification product of rosin modified with maleic acid and partial esterification product of rosin modified with fumaric acid.

6. The binder of claim 1, wherein said resin acid is partial esterification product of pentaerythritol and rosin modified with maleic acid.

7. The binder of claim 1, wherein said resin acid is partial esterification product of diethylene glycol and rosin modified with fumaric acid.

8. The binder of claim 1, wherein said resin acid is partial esterification product of glycerin and rosin modified with fumaric acid.

9. The binder of claim 1, wherein said metal compound is at least one member selected from the group consisting of zinc oxide, calcium hydroxide, magnesium hydroxide and calcium acetate.

10. The binder of claim 1, wherein the amount of said (b) falls within the range of 3 to 28 parts by weight.

11. The binder of claim 1, wherein the amount of said resin acid falls within the range of 10 to 85 parts by weight.

12. The binder of claim 1, wherein the amount of said metal compound falls within the range of 0.1 to 10.5 parts by weight.

13. The binder of claim 1, in which said reaction product is further reacted with 0 to 30 parts by weight of an alcohol per 100 parts by weight of (a) employed.

14. The binder of claim 13, wherein said alcohol is a member selected from the group consisting of diethylene glycol, diethylene glycol monoethyl ether and pentaerythritol.

15. A process for preparing gravure ink binder for paper which comprises the steps of carrying out the heat-reaction between (a) at least one member selected from the group consisting of cyclopentadiene, dicyclopentadiene and substitution products thereof where one or two hydrogens are replaced by methyl group, (b) 1 to 30 parts of at least one member selected from the group consisting of $\alpha,\beta$-ethylenically unsaturated dicarboxylic acids and $\alpha,\beta$-ethylenically unsaturated dicarboxylic acid anhydrides, (c) 5 to 100 parts of a resin acid, and (d) 0.05 to 11 parts of at least one metal compound selected from the group consisting of bivalent metal oxides, bivalent metal hydroxides and bivalent metal acetates at a temperature of 190° to 300° C., and recovering the resulting reaction product having a softening point of 150° to 220° C. and an acid value of not more than 100, said parts of (b), (c) and (d) being parts by weight per 100 parts of (a).

16. The process of claim 15, wherein said heat-reaction is carried out at a temperature of 200° to 270° C.

17. The process of claim 15, in which said resulting reaction product of (a), (b), (c) and (d) is subjected to the reaction with at least one alcohol selected from the group consisting of 2-ethylhexyl alcohol, ethylene glycol monomethyl ether, ethylene glycol monoethyl ether, ethylene glycol monobutyl ether, diethylene glycol monomethyl ether, diethylene glcyol monoethyl ether, diethylene glycol monobutyl ether, ethylene glycol, diethylene glycol, triethylene glycol, neopentyl alcohol, glycerin and pentaerythritol at a temperature of 180° to 270° C., the amount of said alcohol being selected from 0 to 30 parts by weight per 100 parts by weight of (a).

18. A process for preparing gravure ink binder for paper which comprises the steps of carrying out the heat-reaction between (a) at least one member selected from the group consisting of cyclopentadiene, dicyclopentadiene and substitution products thereof where one or two hydrogens are replaced by methyl group, (b) 1 to 30 parts of at least one member selected from the group consisting of $\alpha,\beta$-ethylenically unsaturated dicarboxylic acids and $\alpha,\beta$-ethylenically unsaturated dicarboxylic acid anhydrides, and (c) 5 to 100 parts of a resin acid at a temperature of 190° to 300° C., subjecting the resulting reaction product of (a), (b) and (c) to reaction with (d) 0.05 to 11 parts of at least one metal compound selected from the group consisting of bivalent metal oxides, bivalent metal hydroxides and bivalent metal acetates, in a solvent selected from the group consisting of benzene, toluene, xylene and mineral spirit in the presence of a catalytically effective amount of an organic acid catalyst selected from the group consisting of formic acid, acetic acid, latic acid, tartaric acid and citric acid at a temperature of 50° to 200° C., and recovering the resulting reaction product of (a), (b), (c) and (d) having a softening point of 150° to 220° C. and an acid value of not more than 100, said parts of (b), (c) and (d) being parts by weight per 100 parts of (a).

19. A gravure ink for paper comprising a varnish containing the binder of claim 1 dissolved in an aromatic hydrocarbon solvent and pigment dispersed therein.

* * * * *